US011005165B2

(12) United States Patent
Romano

(10) Patent No.: US 11,005,165 B2
(45) Date of Patent: May 11, 2021

(54) CUBESAT ANTENNA SYSTEM

(71) Applicant: Cal Poly Corporation, San Luis Obispo, CA (US)

(72) Inventor: Samantha Joyce Romano, Escondido, CA (US)

(73) Assignee: CalPoly Corporation, San Luis Obispo, CA (US)

( * ) Notice: Subject to any disclaimer, the term of this patent is extended or adjusted under 35 U.S.C. 154(b) by 143 days.

(21) Appl. No.: 15/938,908

(22) Filed: Mar. 28, 2018

(65) Prior Publication Data

US 2019/0305401 A1    Oct. 3, 2019

(51) Int. Cl.
*H01Q 1/28* (2006.01)
*H01Q 19/10* (2006.01)
*B64G 1/44* (2006.01)

(52) U.S. Cl.
CPC ............. *H01Q 1/288* (2013.01); *B64G 1/443* (2013.01); *H01Q 19/106* (2013.01)

(58) Field of Classification Search
CPC ............ H01Q 1/28; H01Q 1/288; H01Q 1/38; H01Q 1/44; H01Q 19/106; H01Q 21/205; B64G 1/66; B64G 1/1007; B64G 1/443; H04B 7/185
See application file for complete search history.

(56) References Cited

U.S. PATENT DOCUMENTS

| | | | | | |
|---|---|---|---|---|---|
| 6,002,360 | A  * | 12/1999 | Wolcott | ............ | H04B 7/18576 342/354 |
| 6,888,510 | B2 * | 5/2005  | Jo       | ............ | H01Q 21/26 343/700 MS |
| 7,006,039 | B2 * | 2/2006  | Miyamoto | ............ | H01Q 1/22 342/370 |
| 7,583,506 | B1 * | 9/2009  | Huang    | ............ | B64G 1/428 174/252 |
| 8,307,535 | B2 * | 11/2012 | Feller   | ............ | H01Q 1/38 29/592.1 |
| 9,013,360 | B1 * | 4/2015  | Apostolos | ............ | H01Q 9/06 343/793 |
| 9,966,658 | B2 * | 5/2018  | Fitz-Coy | ............ | H01Q 1/288 |
| 2013/0069833 | A1 * | 3/2013 | Lippincott | ............ | H01Q 1/08 343/711 |

* cited by examiner

*Primary Examiner* — Dimary S Lopez Cruz
*Assistant Examiner* — Patrick R Holecek
(74) *Attorney, Agent, or Firm* — Law Office of George B. Leavell

(57) ABSTRACT

A system and method of using a transceiver antenna formed on a fixed outer panel of a cubesat includes electrically coupling an RF feed to a first edge of the outer panel and electrically coupling an RF return to a second edge of the outer panel, the second edge being opposite from the first edge. The RF feed and the RF return being disposed approximately one half a height of the outer panel. An RF distribution plane is electrically coupled to the RF feed and the RF return by substantially equal length circuits. A communication system is electrically coupled to the RF distribution plane. The transceiver antenna does not require deployment and thus improves reliability.

17 Claims, 20 Drawing Sheets

CUBESAT ANTENNA SYSTEM

FIELD OF THE DISCLOSURE

The present invention relates generally to satellites, and more particularly, to systems, methods and apparatus for pico-class satellite antennas.

BACKGROUND

Satellite systems are traditionally relatively large in physical size and mission complexity. Recent developments have led to smaller, simplified satellite systems. One class of relatively small satellite systems is referred to as pico-class satellite or a cubesat. The cubesats are built in a 10 cm cube physical format. Some versions of the cubesats can include one, two or three or more cubes connected together. The cubesats use a standardized deployment system that contains the cubesats for the flight to orbit. The deployment system deploys the cubesats into space, after the launch vehicle arrives in the intended orbit.

Once deployed, the cubesats begin to perform their intended mission functions. One of the vital mission functions of the cubesat is to establish and maintain communications with one or more ground or orbital locations. The communications are required for receiving and sending cubes at operations and experiment data to and from the cubesat. The cubesat includes one or more transceiver antennas to support the communications.

Typically, each cubesat includes the antenna in a collapsed or stowed configuration during launch. The antenna is then extended during the deployment of the cubesat. Unfortunately, the antennas often fail to properly deploy and the cubesat is unable to establish or maintain the required communications. Failing to deploy the antenna renders the cubesat mission a failure. It is in this context that the following embodiments arise.

SUMMARY

Broadly speaking, the present disclosure fills these needs by providing a cubesat with a fixed transceiver antenna system that does not require deployment. It should be appreciated that the present disclosure can be implemented in numerous ways, including as a process, an apparatus, a system, computer readable media, or a device. Several inventive embodiments of the present disclosure are described below.

In one implementation, the fixed transceiver antenna is formed on four sides of the cubesat and generates an RF emission pattern that is substantially symmetrical at a 0 degree phi, cross-section. The adjacent sides of the four sides of the cubesat are separated by an edge gap. The RF emission is emitted from the edge gap. The edge gap helps determine a bandwidth of the RF emission. The fixed transceiver antenna does not require deployment when the cubesat is deployed and thus simplifies the cubesat design and improves cubesat reliability.

The RF is distributed equally to each of the four sides of the cubesat by a RF distribution plane that contains substantially equal length RF current paths to each outer panel. The substantially equal length RF current paths can be substantially equal physical length and/or substantially equal electrical length.

Each of the outer panels can also include an active electrical component that is electrically isolated from the transceiver antenna. This allows each outer panel to perform at least two functions: transceiver antenna and an instrument or sensor or a solar cell.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for a fixed cubesat communications transceiver antenna system will now be described. It will be apparent to those skilled in the art that the present disclosure may be practiced without some or all of the specific details set forth herein.

Figure 1A:
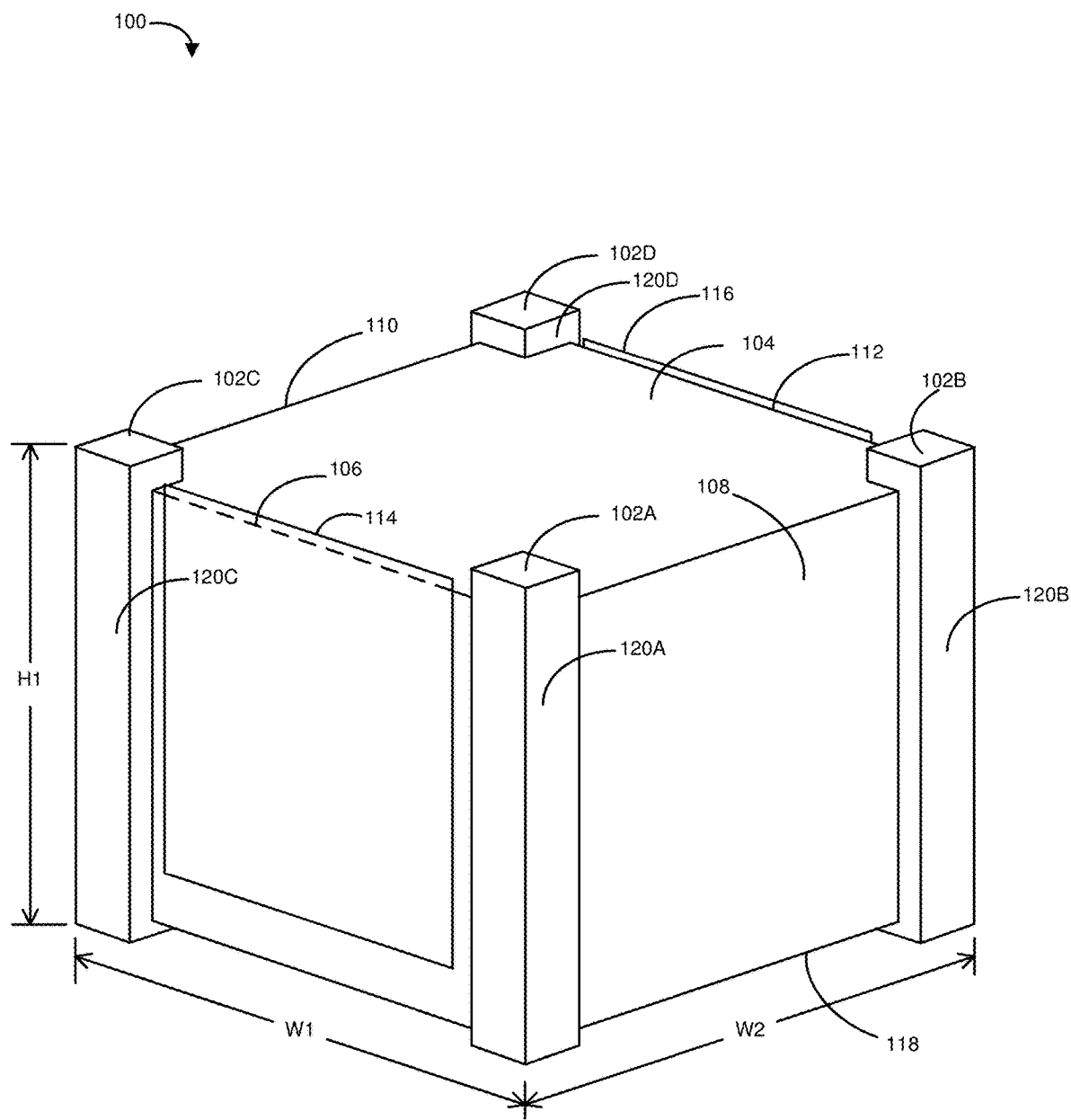
FIG. 1A illustrates a schematic view of a single unit cubesat, for implementing embodiments of the present disclosure.
Figure 1B:
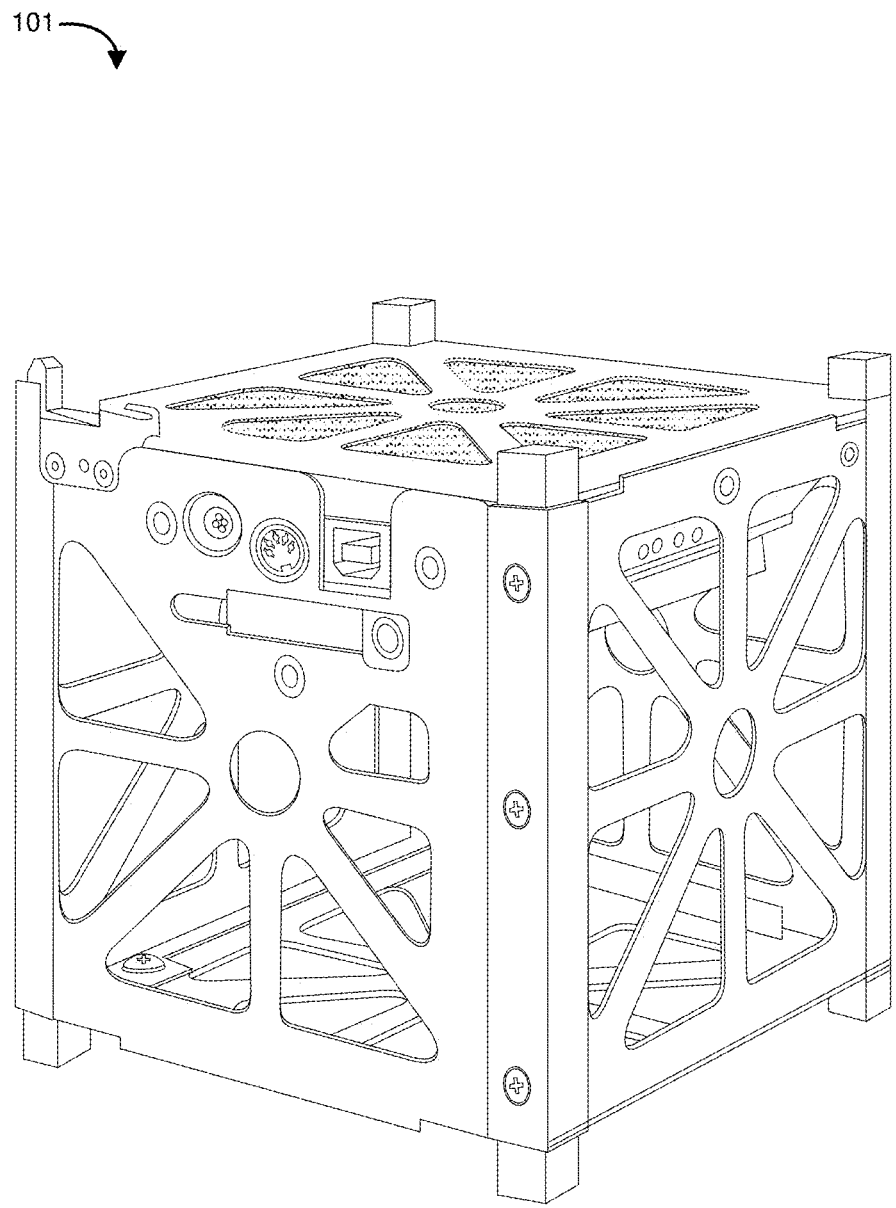
FIG. 1B illustrates a schematic view of a chassis of the single unit cubesat, for implementing embodiments of the present disclosure.

FIG. 1A illustrates a schematic view of a single unit cubesat 100, for implementing embodiments of the present disclosure. FIG. 1B illustrates a schematic view of a chassis 101 of the single unit cubesat 100, for implementing embodiments of the present disclosure. The form factor of the single unit cubesat 100 as shown is a single unit. The single unit cubesat has a standardized physical size bounded by the height H1, width W1 and depth W2. By way of example, the height H1, width W1 and depth W2 are about 100.0+/−0.1 mm.

The single unit cubesat includes a top 104, sides 106, 108, 110, 112, a bottom 118 and rails 120A-D. Access ports 114 and 116 are provided in sides 106 and 112, respectively. The access ports 114 and 116 provide access to the internal volume of the single unit cubesat. Each end 102A-102D of the rails 120A-D can include one or more deployment switches and/or separation springs that assist in the deployment and/or separation of the cubesat 100 from a launch/deployment vehicle.

Figure 1C:
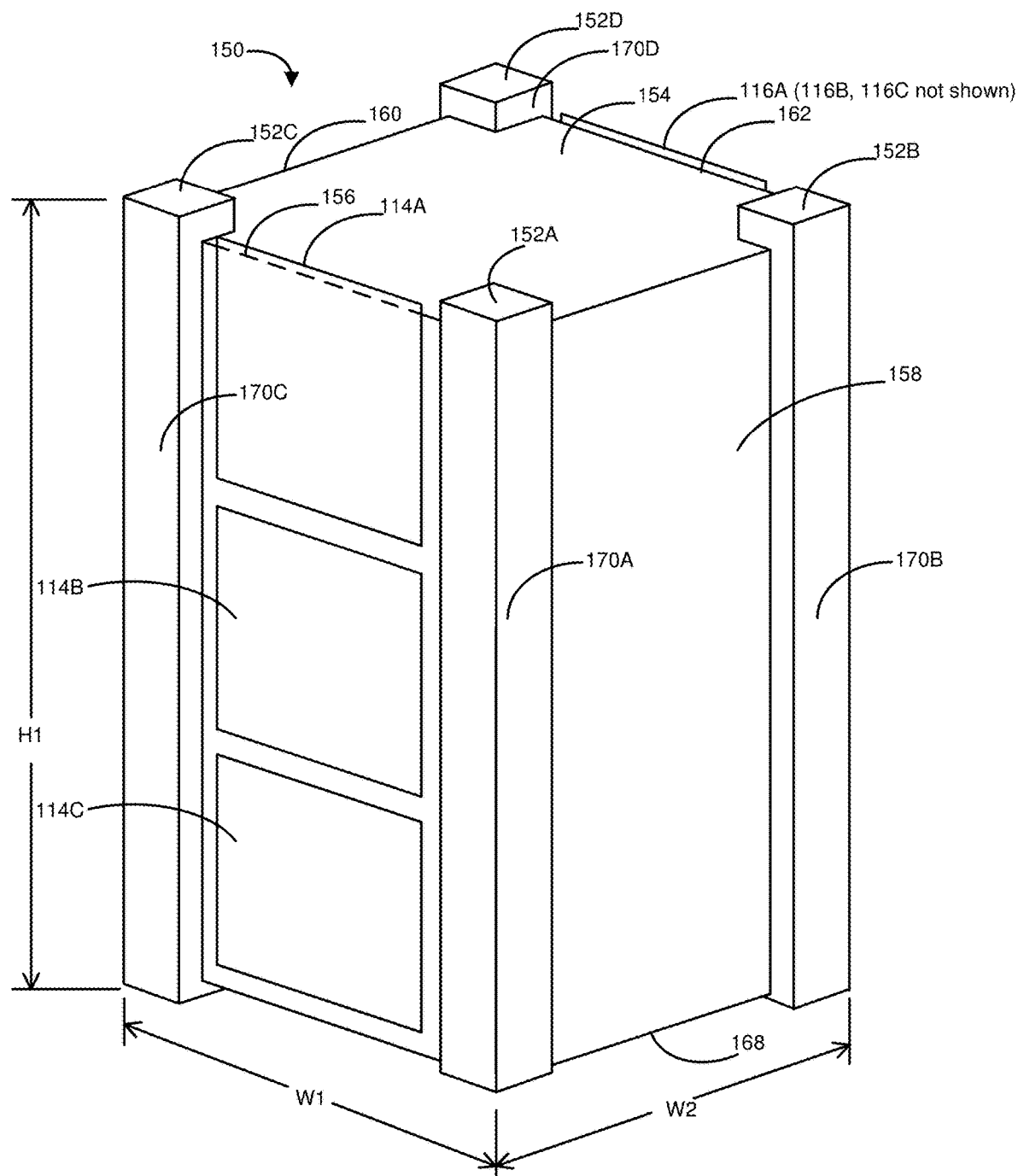
FIG. 1C illustrates a schematic view of a 3-unit cubesat, for implementing embodiments of the present disclosure.

FIG. 1C illustrates a schematic view of a 3-unit cubesat 150, for implementing embodiments of the present disclosure. The 3-unit cubesat 150 has a standardized physical size bounded by the same width W1 and depth W2 as the single unit cubesat 100, shown in FIG. 1A. The 3-unit cubesat 150 has a standardized height of three times (e.g., 3H1) the single unit cubesat height H1 shown in FIG. 1A. The 3-unit cubesat includes a top 154, sides 156, 158, 160, 162, a bottom 168 and rails 170A-D. Access ports 114A-114C and 116A-116C are provided in sides 156 and 162, respectively. The access ports 114A-114C and 116A-116C, provide access to the internal volume of the 3-unit cubesat 150. Each end 152A-152D of the rails 170A-D can include one or more deployment switches and/or separation springs that assist in the deployment and/or separation of the cubesat 150 from the launch/deployment vehicle.

Figure 2A:
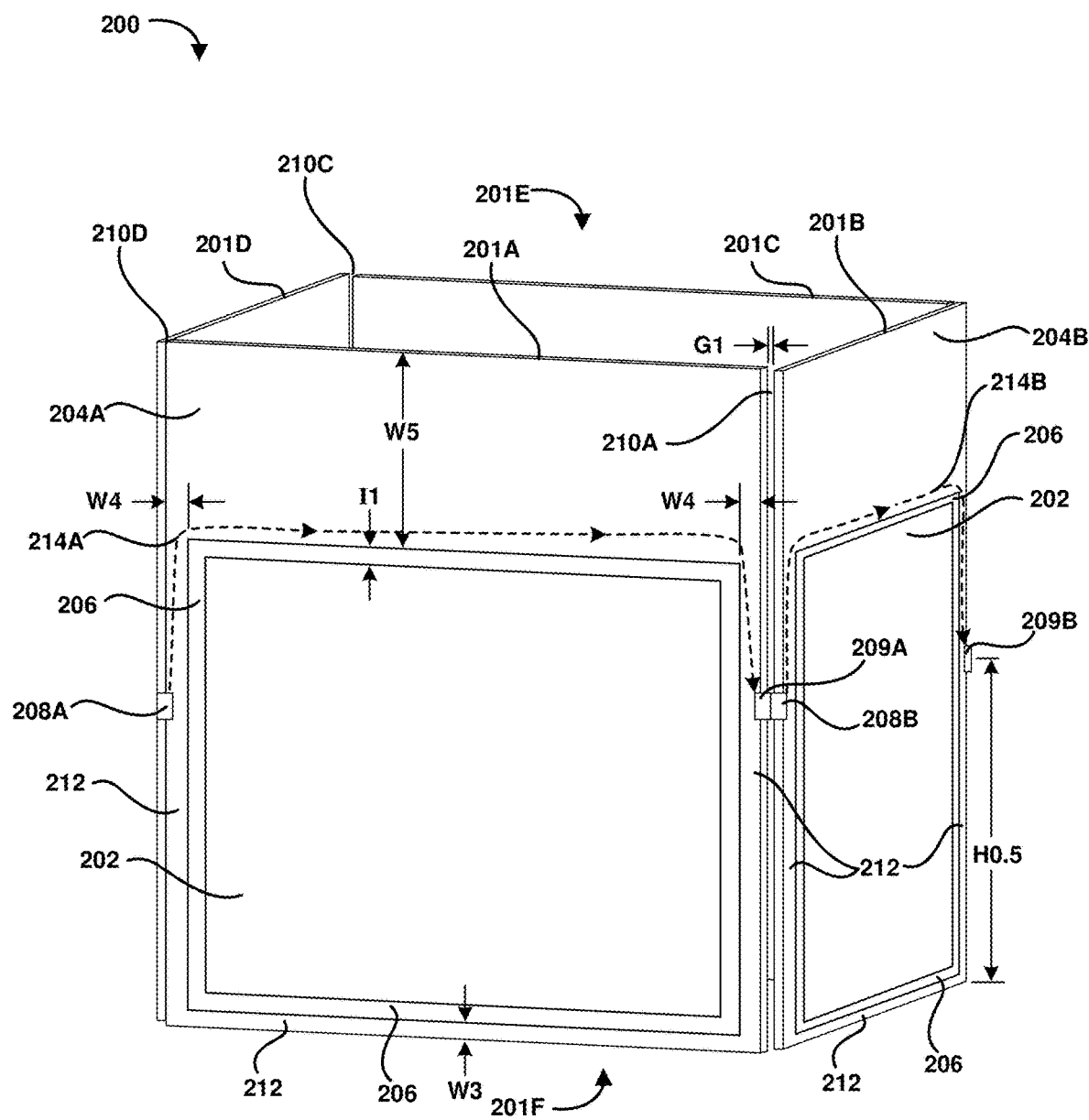
FIG. 2A illustrates a schematic view of outer panel assembly of a 1-unit cubesat, for implementing embodiments of the present disclosure.

FIG. 2A illustrates a schematic view of outer panel assembly 200 of a 1-unit cubesat 100, for implementing embodiments of the present disclosure. The outer panels 201A-D are fixed to the chassis 101 of the cubesat 100, 150. At least one of the outer panels 201A-D include a first portion 202 and a transceiver antenna 204A that are separated by an isolation gap 206 having an isolation gap width H. The first portion 202 can be used for a solar cell or other function as may be desired based on the mission for the cubesat 100. In one implementation the solar cell is about 83 mm wide and about 69 mm tall. It should be understood that larger or smaller solar cells can be used in a similar manner as long as the solar cell remains within the first portion 202. The first portion 202 is separated from the edge of the outer panel by an edge portion 212 of the transceiver antenna 204. The edge portion 212 of the transceiver antenna 204 has a width W4. The first portion 202 can be powered or grounded. By way of example, an active electrical component such as an instrument or a sensor or a solar cell can consume or generate an electrical current across the first portion 202. The transceiver antennas support the communication systems (not shown) in the cubesat 100. The isolation gap 206 provides an electrical separation between the transceiver antennas 204 and first portion 202.

RF feed 208A and RF return 209A connects the transceiver antennas 204 to the communication systems in the cubesat 100. The RF feed 208A and RF return 209A are located substantially centered on the edges of the transceiver antenna 204 such that H0.5 is substantially one half a height of the outer panel 201A-D. In one implementation, the outer panels 201A-D have a width of 100 mm and a height of 90 mm Placing the RF feed 208A and RF return 209A substantially centered on the edges of the transceiver antenna 204 provides a uniform RF current flow through the transceiver antenna. In one implementation, the RF feeds 208A-D and corresponding RF returns 209A-D may be offset by between about 0.1 mm to about 2 mm from one half height H0.5 of the 1 unit cubesat 100.

In one implementation, only one outer panel 201A includes a transceiver antenna 204. In other implementations, the two opposing outer panels 201A, 201C, or two adjacent outer panels 201A, 201B or three outer panels 201A-C or four outer panels 201A-D of the cubesat 100 can include transceiver antennas 204A-D. In one implementation, each of the four outer panels 201A-D of the cubesat 100 will include the transceiver antennas 204A-D so that the antennas can radiate RF in all four directions. In one implementation, outer panels 201A-D are substantially identical sizes, shapes and arrangement of the first portion 202 and the trans transceiver antenna 204A-D. In one implementation, each of the four outer panels 201A-D and a top outer panel 201E and a bottom outer panel 201F of the cubesat 100 can include the transceiver antennas 204 so that the antennas can radiate RF in all six directions.

Figure 2B:
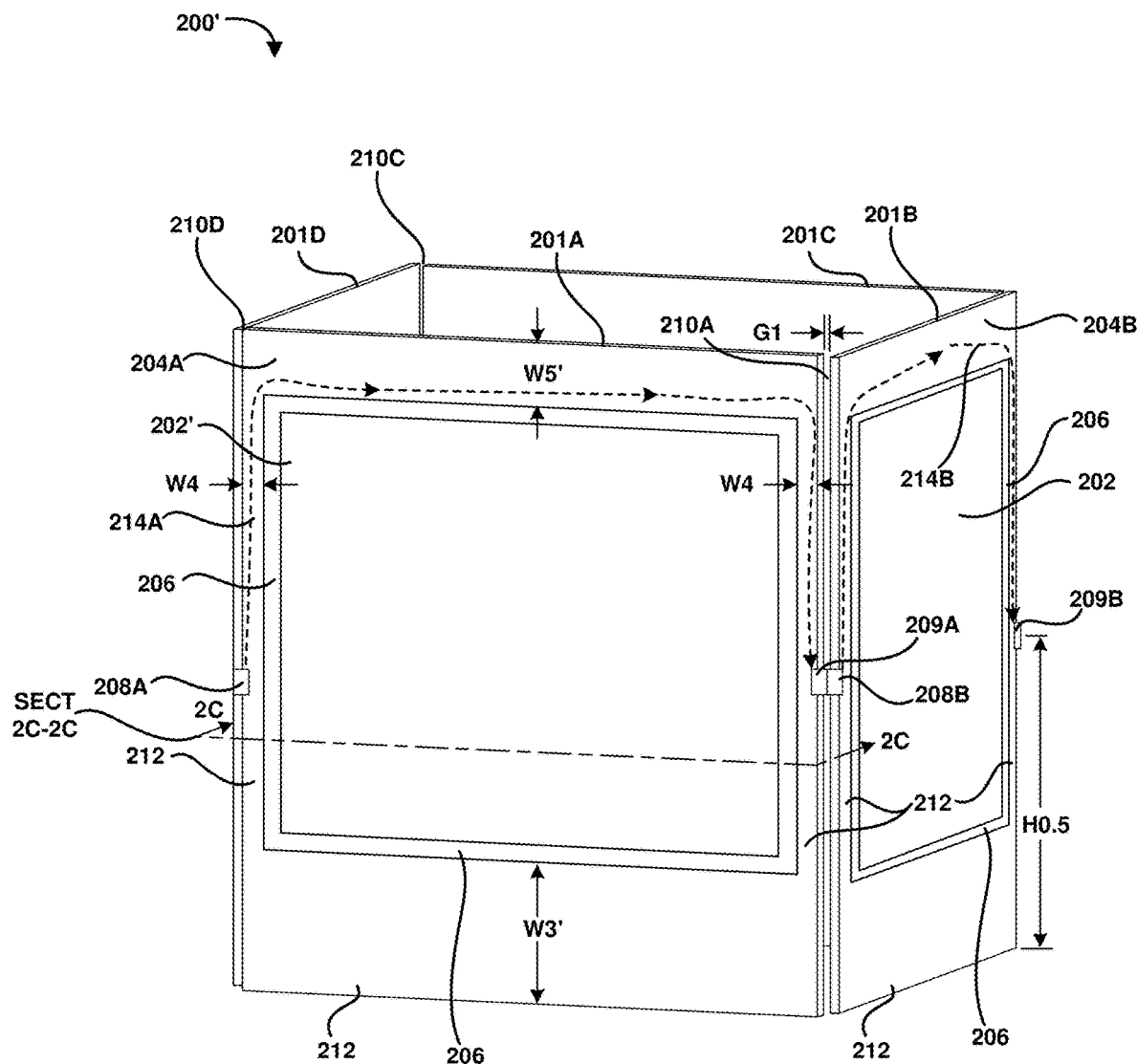
FIG. 2B illustrates a schematic view of outer panel assembly of a 1-unit cubesat, for implementing embodiments of the present disclosure.

FIG. 2B illustrates a schematic view of outer panel assembly 200' of a 1-unit cubesat 100, for implementing embodiments of the present disclosure. The outer panel assembly 200' is substantially similar to the outer panel assembly 200, however the first portions 202' have been enlarged and moved as compared to the first portions 202. While, FIGS. 2A and 2B illustrate a 1-unit cubesat, it should be understood that one or more of the described outer panel assemblies 200, 200' could be included in a 2, 3 or more unit cubesat. It should be understood that FIGS. 2A and 2B are not drawn to scale and the relative dimensions and scales of the various portions and features may be smaller or larger than depicted.

In RF emission or radiation operation, on outer panel 201A, the RF current 214A flows from the RF feed 208A through the transceiver antenna 204A to the RF return 209A. Similarly, on outer panel 201B, the RF current 214B flows from the RF feed 208B through the transceiver antenna 204B to the RF return 209B. RF current follows similar paths on each of the outer panels 201C and 201D. The RF radiates from the edge gaps 210A-D between the edges of the outer panels 201A-D. The edge gaps 210A-D have a width G1. The width G1 of the edge gaps 210A-D determines a bandwidth of the radiated RF. By way of example, an edge gap 201A having a width G1 of about 4.2 mm provides a bandwidth of about 5 MHz. The edge gap 201A width G1 can be between about 3 mm and about 6 mm. In one implementation the edge gap 201A has a width G1 of 4.2426 mm. In another implementation changing the edge gap 201A width G1 of relatively small amounts such as about +/−0.005 mm can vary the bandwidth from the 5 MHz with a G1 equal to about 4.2 mm.

The edge portion 212 width W4 can be between about 2.0 mm and about 4.0 mm. In one implementation, the edge portion 212 width W4 can be about 2.545 mm. The antenna upper portion widths W5 and W5' can be between about 25 mm and about 30 mm. In one implementation, width W5 is about 27.5 mm. The antenna lower portion widths W3 and W3' of the transceiver antenna 204 can be between about 1.0 mm and about 10.0 mm. In one exemplary implementation, the lower portion width W3 is about 1.5 mm Isolation gap width I1 corresponds to the RF current flow. Isolation gap width I1 is wide enough to prevent the RF current flow 214A from arcing across the isolation gap 206. By way of example, if the RF current flow 214A is about 1 amp, the isolation gap width I1 can be as small as about 0.25 mm. Of course, it should be understood that isolation gap width I1 can be larger than a minimum width to prevent the RF current flow 214A from arcing across the isolation gap 206. In one exemplary implementation, the isolation gap width I1 is about 1.25 mm. It should also be understood that the dimensions of the transceiver antenna system disclosed herein provide an operable antenna in the range of about 400-450 MHz and specifically at about 437 MHz, however, with relatively minor adjustments to the various dimensions of the transceiver antenna, the resulting antenna could be made to function in a similar fashion and efficiency within a range of between about 200 MHz and about 1200 MHz.

Figure 2C:
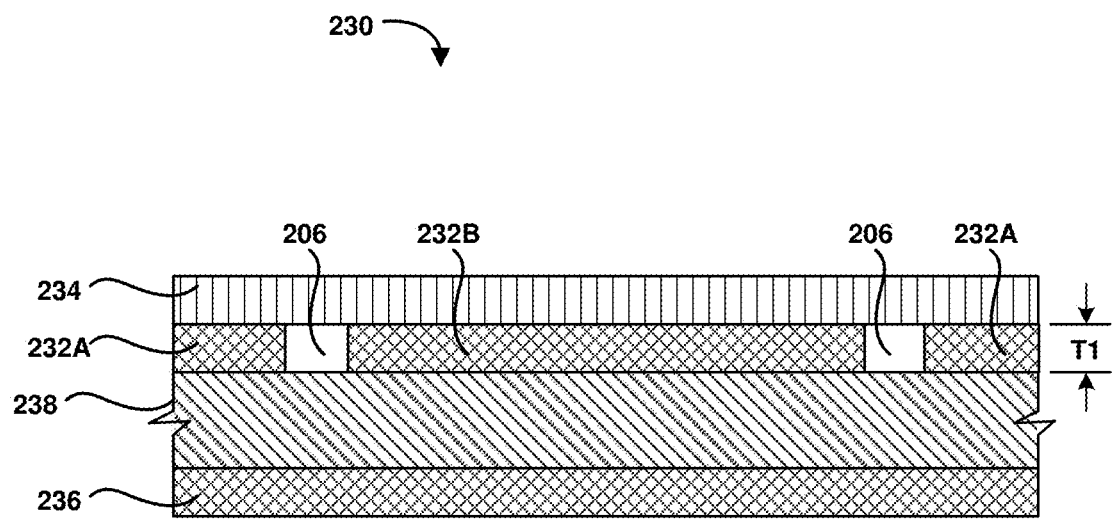
FIG. 2C is a cross sectional (Sect 2C-2C) view of the transceiver antenna, for implementing embodiments of the present disclosure.

FIG. 2C is a cross sectional (Sect 2C-2C) view 230 of the transceiver antenna 204A-D, for implementing embodiments of the present disclosure. The transceiver antenna 204A-D can be formed from a first conductive material layer 232A, 232B on a non-conductive substrate 238. The first conductive material layer 232A, 232B can be copper, copper alloys, gold, silver, conductive carbon materials or other conductors and alloys and combinations thereof. The first conductive material layer 232A, 232B can be formed from any suitable method such as a plating or a sputtering or a chemical deposition or any other suitable method of forming the first conductive material layer on the substrate 238.

In one implementation, the first conductive material layer 232A, 232B can include a first portion of the first conductive material layer 232A and a second portion of the first conductive material layer 232B. The transceiver antenna 204A-D can be formed from the first conductive material layer 232A. The second portion of the first conductive material layer 232B extends through the first portion 202, 202' of the outer panel 201A. As shown in FIGS. 2A and 2B above, gaps 206 electrically isolate the second portion of the first conductive material layer 232B from the first portion of first conductive material layer 232A. As a result, the second portion of the first conductive material layer 232B can have a different potential applied than the first portion of the first conductive material layer 232A. By way of example, the first portion of the second conductive material layer 232B can be grounded or a selected alternating or direct electrical current can be flowing through the second portion of the first conductive material layer while the RF current is flowing through the first portion of first conductive material layer 232A.

The first conductive material layer 232A, 232B has a first conductive material thickness T1 sufficient to conduct the RF current of the communication systems within the cubesat 100. The first conductive material thickness T1 is also sufficient to withstand the exposure to the operational conditions of space. In one implementation, the first conductive material thickness T1 is between about 0.030 mm and about 0.015 mm. In other implementations the first conductive material thickness T1 can be thinner than 0.015 mm and thicker than 0.030 mm. In one implementation, the conductive material thickness T1 can be between about 0.005 mm and about 1.0 mm One limitation of the maximum first conductive material thickness T1 is weight for the cubesat 100 as minimizing weight is always a goal for satellites and weight increases as T1 increases. One limitation of the minimum first conductive material thickness T1 is RF current handling requirements. The first conductive material thickness T1 as RF current handling capability decreases as T1 decreases. As first conductive material thickness T1 increases, the service life of the transceiver antenna can be increased as thicker conductive material can last longer in the harsh orbital environment outside the Earth's atmosphere.

The non-conductive substrate 238 can be made of any suitable non-conductive material such as ceramics, composites, plastics, or other suitable materials. In at least one implementation, the non-conductive substrate 238 can provide structural strength sufficient to support the first conductive material layer 232.

In another optional implementation, the first conductive material layer 232 can be covered in an optional non-conductive, RF transparent layer 234. The optional RF transparent layer 234 can provide a protective layer to the first conductive material layer 232.

In another optional implementation, a second conductive layer 236 can be included on second surface of the non-conductive substrate 238, opposite from the first conductive material layer 232. The second conductive layer 236 can have a thickness similar or different substantially different from the first conductive material thickness T1. It should be understood that FIG. 2C is not drawn to scale and the relative dimensions and scales of the various portions and features may be smaller or larger than depicted.

Figure 3A:
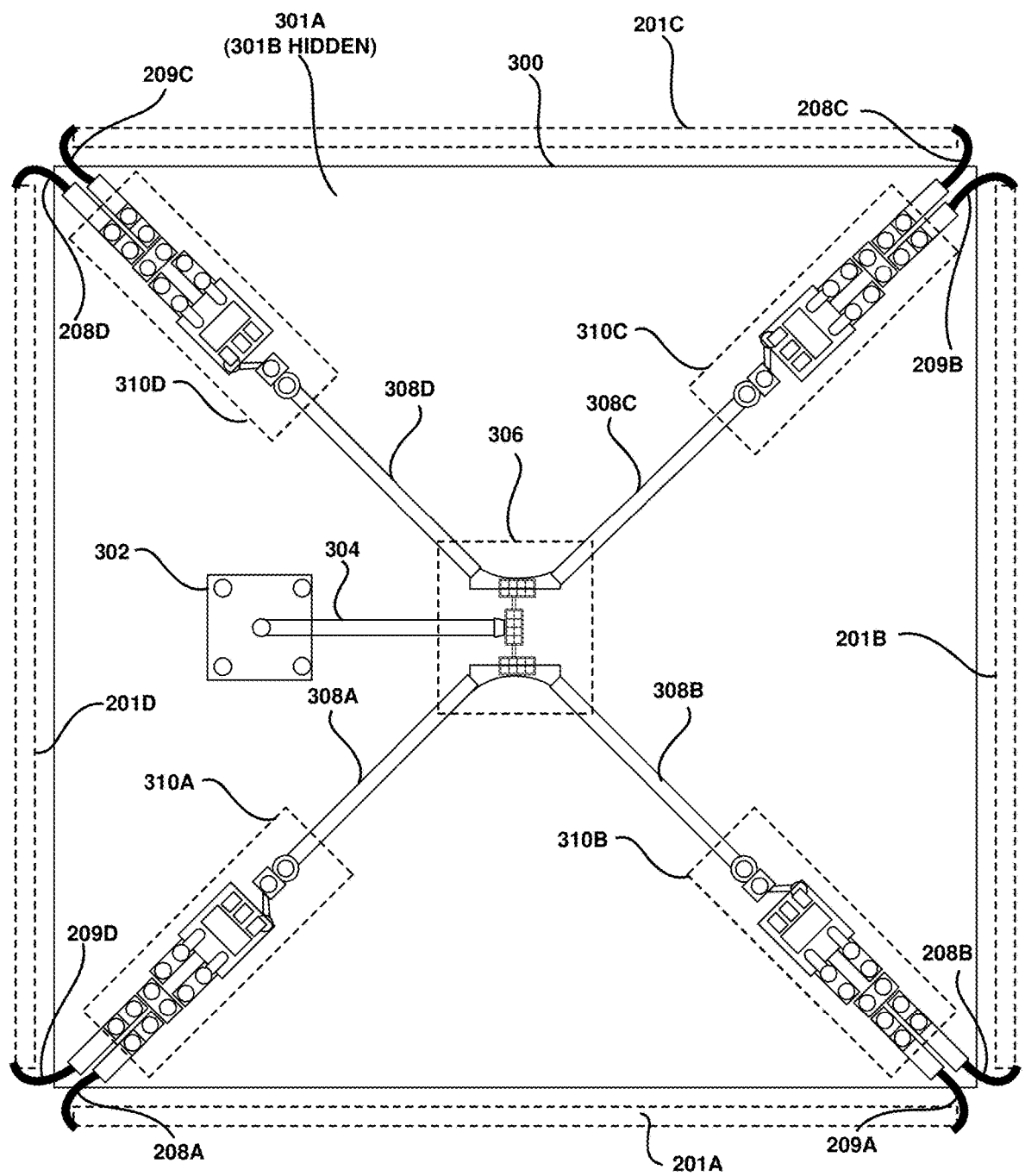
FIG. 3A illustrates a schematic view of an RF distribution plane in the cubesat, for implementing embodiments of the present disclosure.

FIG. 3A illustrates a schematic view of an RF distribution plane 300 in the cubesat 100, for implementing embodiments of the present disclosure. It should be understood that FIG. 3A is not drawn to scale and the relative dimensions and scales of the various portions and features may be smaller or larger than depicted. The RF distribution plane 300 includes an RF input/output port 302, coupled to a RF distribution point 306 by an RF feed line 304. The RF distribution point 306 is coupled to four balun systems 310A-D by corresponding RF distribution feeds 308A-D. Each of the four balun systems 310A-D have RF feeds 208A-D and RF returns 209A-D. The RF feeds 208A-D and RF returns 209A-D couple the four balun systems 310A-D to the four outer panels 201A-D.

The four balun systems 310A-D, the corresponding RF distribution feeds 308A-D, the RF feeds 208A-D and RF returns 209A-D form four RF current paths between the RF distribution point 306 to and from the corresponding transceiver antennas 204A-D in the outer panels 201A-D. In one implementation, the four balun systems 310A-D, the corresponding RF distribution feeds 308A-D, the RF feeds 208A-D and RF returns 209A-D have substantially equal electrical length between the RF distribution point and the corresponding edges of the at least one outer panel. The substantially equal electrical length provides a corresponding substantially equal distribution of the RF power to and from the RF distribution point 306 to and from the corresponding transceiver antennas 204A-D in the outer panels 201A-D. In one implementation, the substantially equal electrical can be achieved with substantially equal physical length of each of the four RF current paths between the RF distribution point 306 and the corresponding transceiver antennas 204A-D in the outer panels 201A-D.

In at least one implementation, the RF distribution plane 300 includes a ground plane formed on at least one of an upper surface 301A or a lower surface 301B, where the lower surface is opposite from the upper surface. In one implementation, at least a first portion of each of the balun systems 310A-D are disposed on the upper surface 301A and at least a second portion of each of the balun systems are disposed on the lower surface 301B. As will be described in more detail below, the balun systems 310A-D provide impedance matching between a 50 impedance RF input/output port of the communication system onboard the cubesat 100 and the four transceiver antennas 204A-D in the outer panels 201A-D. The RF distribution feeds 308A-D and the RF feed line 304 can be formed in a conductive layer on the upper surface 301A or the lower surface 301B similar to the formation of the transceiver antenna 204A-D, described above. The RF distribution plane having a layered structure substantially similar to the structure of the outer panels, as described in FIG. 2C above.

Figure 3B:
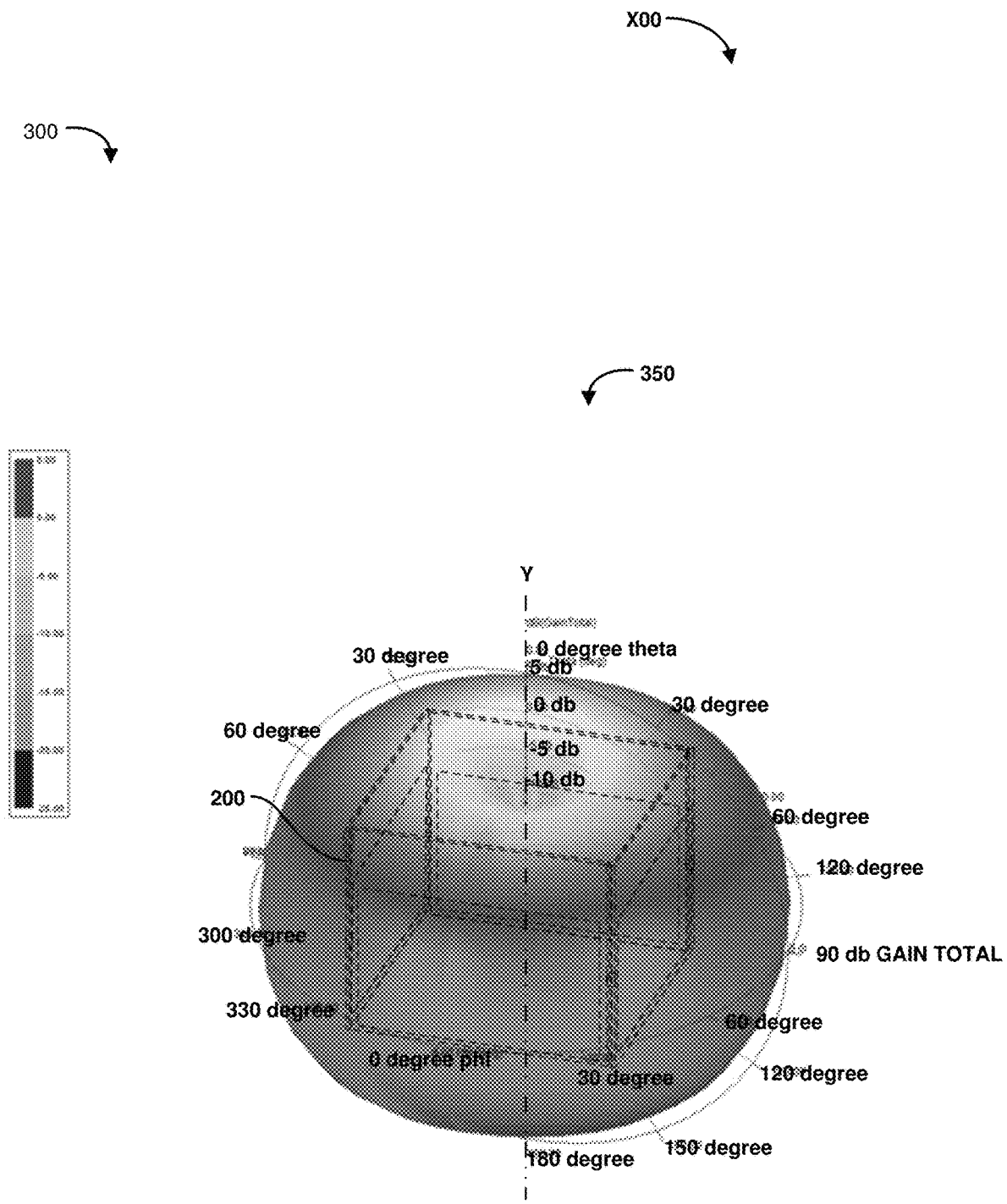
FIG. 3B is a 3-dimensional, polar plot graph of the RF power emissions from the four symmetrical transceiver antennas in the outer panel assembly of cubesat, for implementing embodiments of the present disclosure.
Figure 3C:
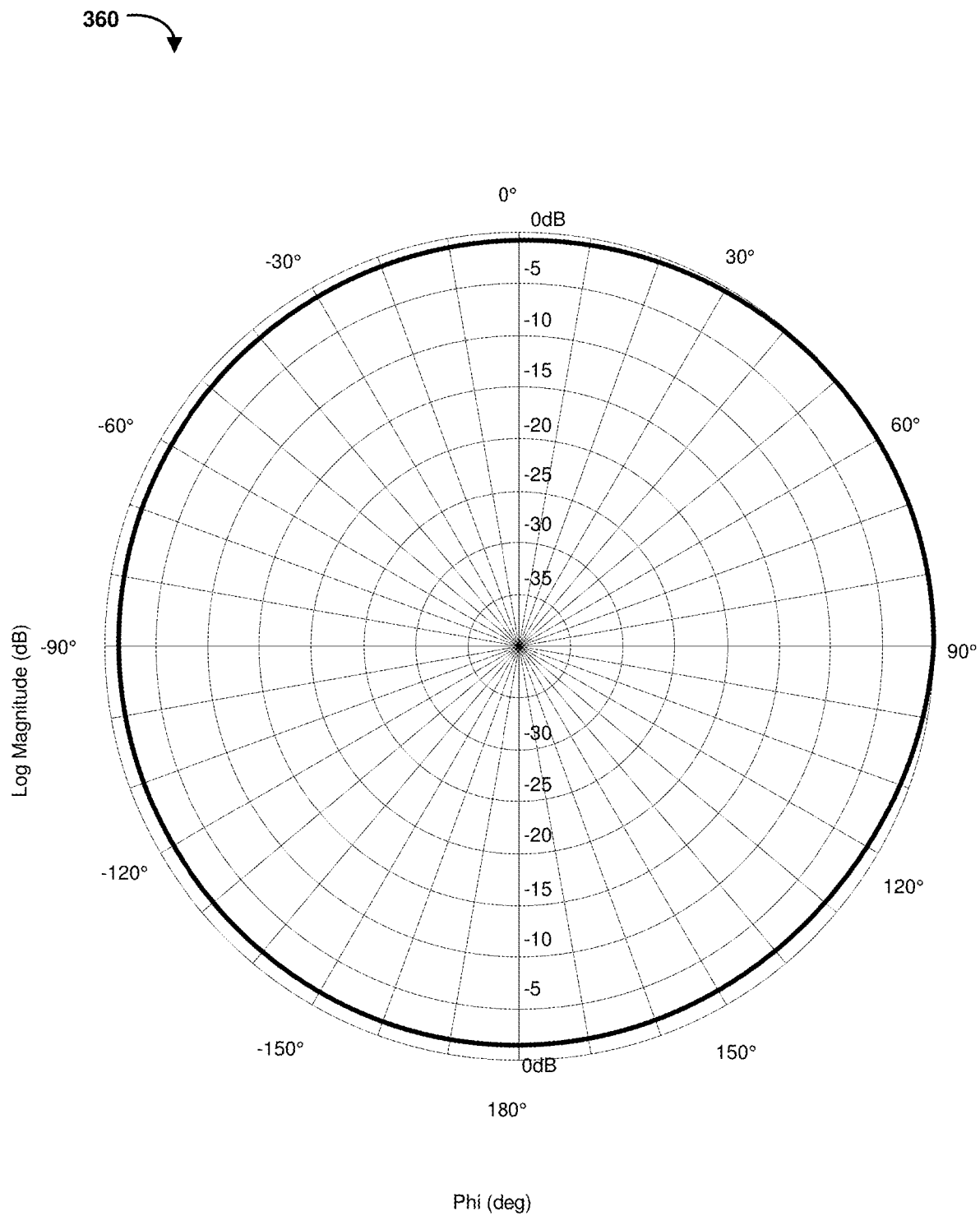
FIG. 3C is a 0 degree phi, cross-section view of the 3-dimensional, polar plot graph of the RF power emissions from the four symmetrical transceiver antennas in the outer panel assembly of cubesat, for implementing embodiments of the present disclosure.
Figure 3D:
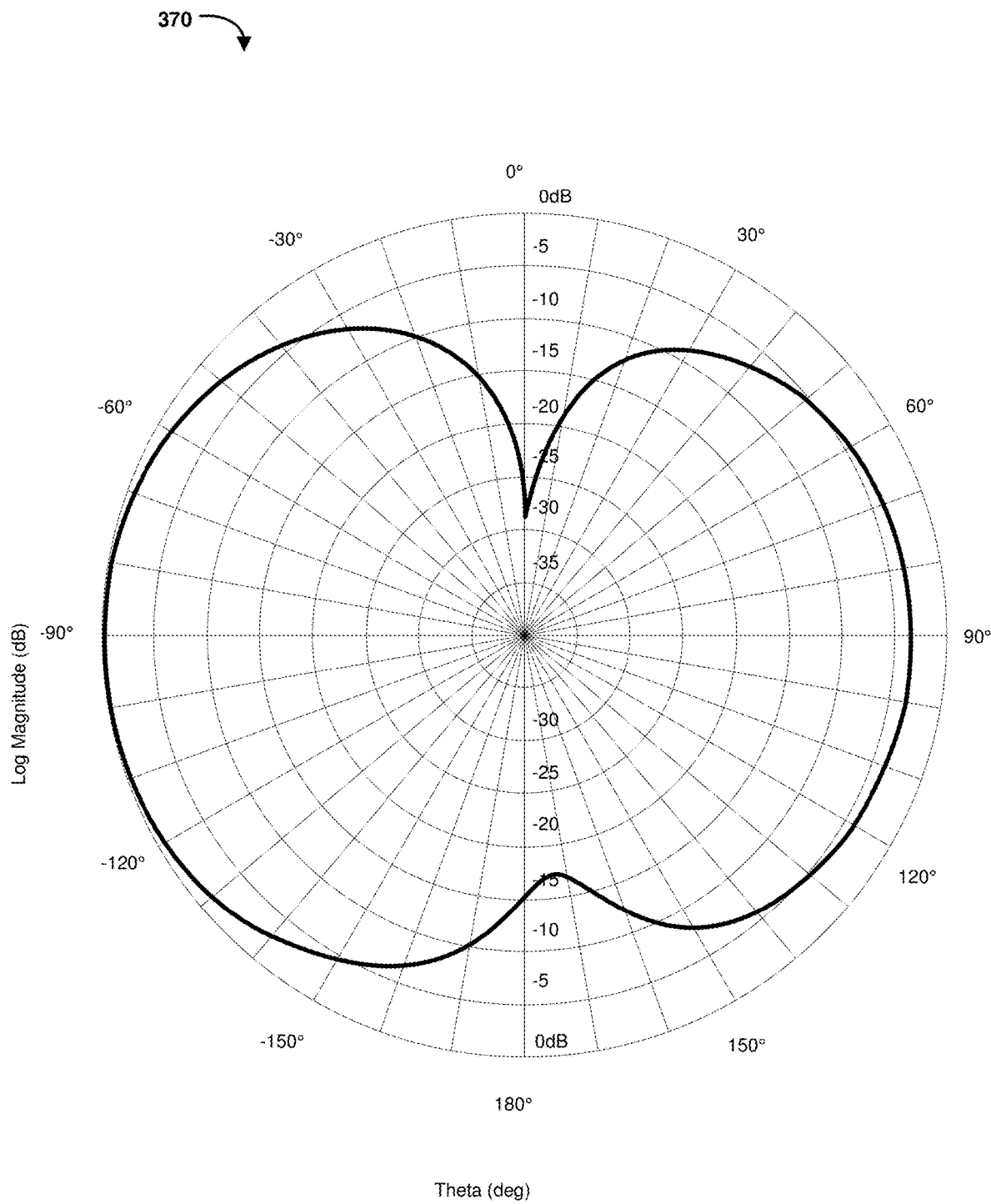
FIG. 3D is a 0 degree theta, cross-section view of the 3-dimensional, polar plot graph of the RF power emissions from the four symmetrical transceiver antennas in the outer panel assembly of cubesat, for implementing embodiments of the present disclosure.

FIG. 3B is a 3-dimensional, polar plot graph 350 of the RF power emissions from the four symmetrical transceiver antennas 204A-D in the outer panel assembly 200 of cubesat 100, for implementing embodiments of the present disclosure. The outer panel assembly 200 is substantially centered in the polar plot graph 350 with the upper panel 201E of the outer panel assembly 200 substantially centered on a vertical polar axis Y (0 degree theta). FIG. 3C is a 0 degree phi, cross-section view 360 of the 3-dimensional, polar plot graph 350 of the RF power emissions from the four symmetrical transceiver antennas 204A-D in the outer panel assembly 200 of cubesat 100, for implementing embodiments of the present disclosure. FIG. 3D is a 0 degree theta, cross-section view 370 of the 3-dimensional, polar plot graph 350 of the RF power emissions from the four symmetrical transceiver antennas 204A-D in the outer panel assembly 200 of cubesat 100, for implementing embodiments of the present disclosure.

The RF emission density is substantially symmetrical around the perimeter (e.g. 360 degrees phi at 90 degrees theta) of the outer panel assembly 200 with substantial null RF emission in an upper polar region beginning at about +/−30 degrees from 0 degrees theta and a substantially symmetrical lower polar region at beginning at about +/−30 degrees from 180 degrees theta. The upper polar region corresponds to the upper panel 201E of the outer panel assembly 200, in an implementation where the upper panel does not include a transceiver antenna. The lower polar region corresponds to the lower panel 201F of the outer panel assembly 200, in an implementation where the lower panel does not include a transceiver antenna. The substantially symmetrical RF emission density around the perimeter has a gain of about 5 db.

Figure 3E:
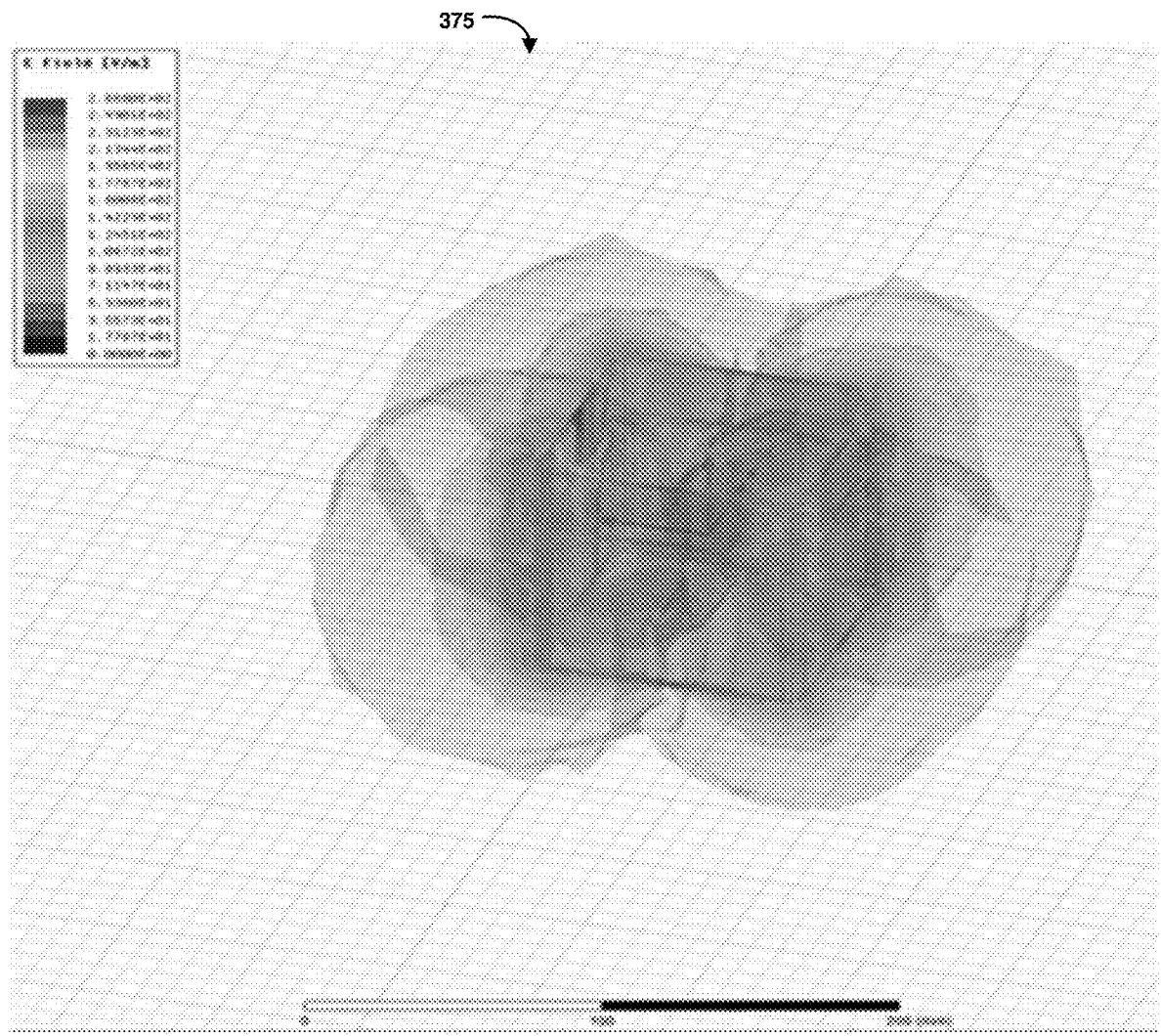
FIG. 3E is an RF field pattern graph of the RF power emissions from the four symmetrical transceiver antennas in the outer panel assembly of cubesat, for implementing embodiments of the present disclosure.

FIG. 3E is an RF field pattern graph 375 of the RF power emissions from the four symmetrical transceiver antennas 204A-D in the outer panel assembly 200 of cubesat 100, for implementing embodiments of the present disclosure. The RF field pattern shows the RF power is emitted from the gaps 210A-D along the edges of the four symmetrical transceiver antennas 204A-D in the outer panel assembly 200.

Figure 3F:
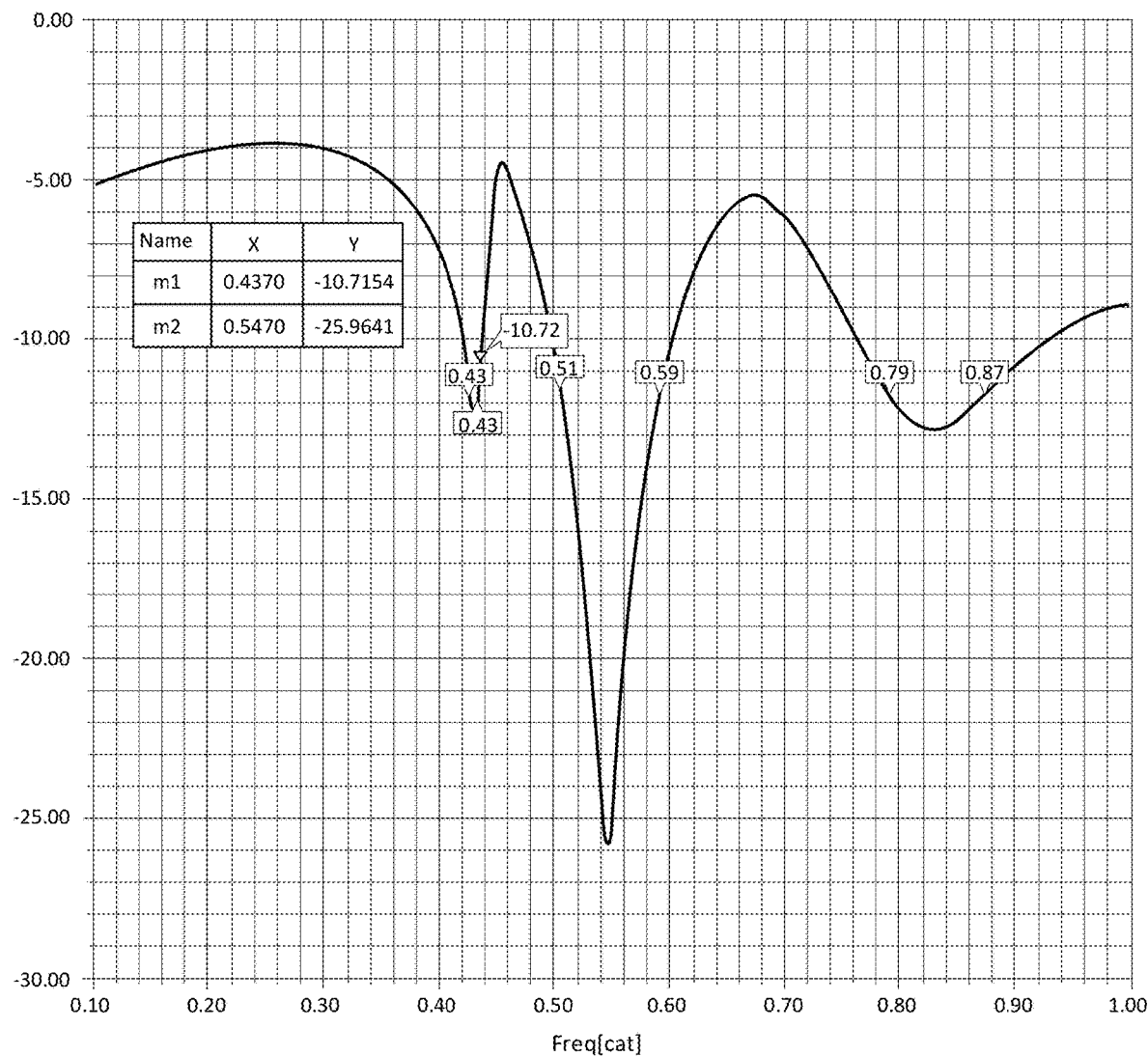
FIG. 3F is a graphical representation of an RF standing wave of the RF power emissions from the four symmetrical transceiver antennas in the outer panel assembly of cubesat, for implementing embodiments of the present disclosure.

FIG. 3F is a graphical representation of an RF standing wave 380 of the RF power emissions from the four symmetrical transceiver antennas 204A-D in the outer panel assembly 200 of cubesat 100, for implementing embodiments of the present disclosure. The RF standing wave has a relatively minimal standing wave ratio of between about −7 db and about −10 db within the selected operational frequency range of 437 MHz. It should be understood that 437 MHz is only an exemplary frequency and with minor adjustments to the physical dimensions, and the electrical component values, other frequencies could also be utilized with a similar efficiency.

Figure 3G:
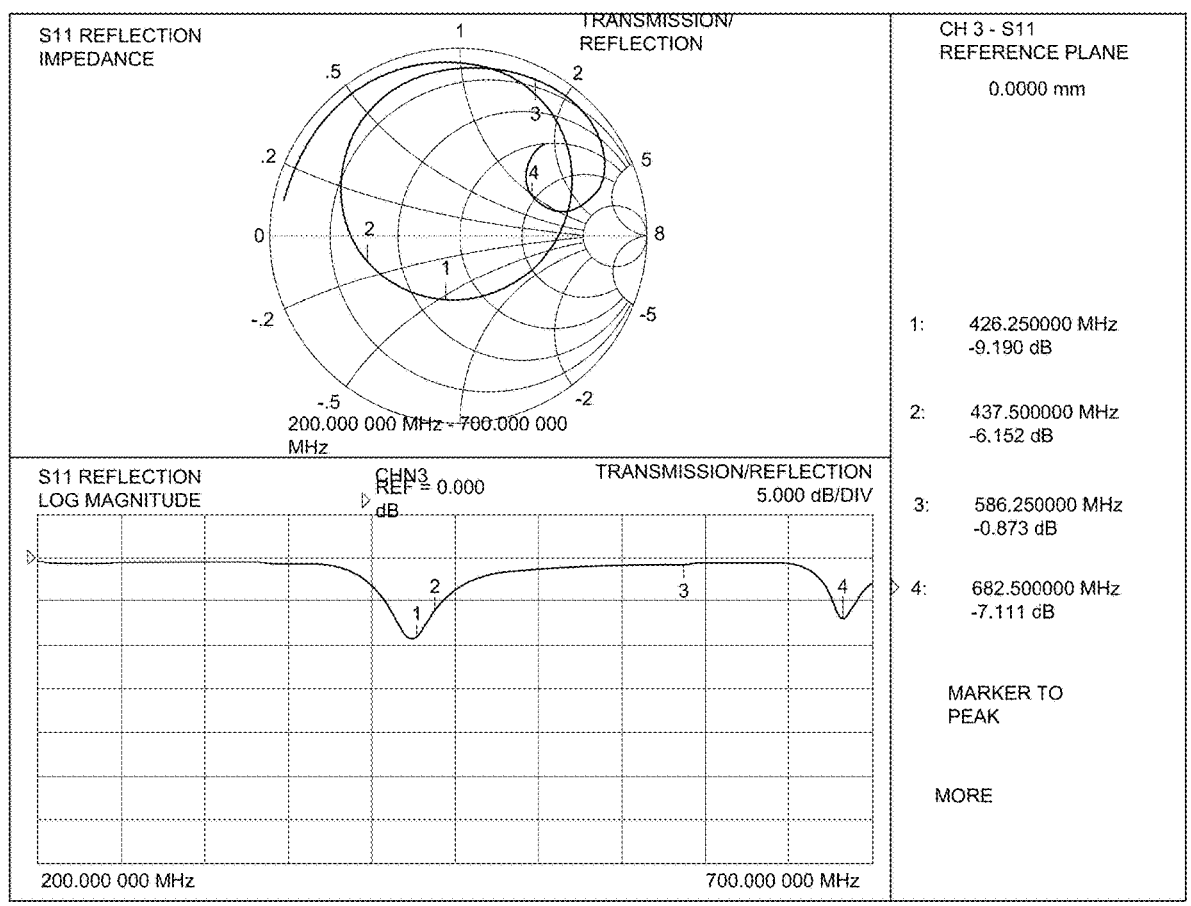
FIG. 3G is a graphical representation of an RF standing wave of the RF power emissions from the four symmetrical transceiver antennas in the outer panel assembly of cubesat, for implementing embodiments of the present disclosure.

FIG. 3G is a graphical representation of an RF standing wave 385 of the RF power emissions from the four symmetrical transceiver antennas 204A-D in the outer panel assembly 200 of cubesat 100, for implementing embodiments of the present disclosure. The RF standing wave has a relatively minimal standing wave ratio of between about −9 db and about −7 db within the selected operational frequency range of between about 426 MHz and about 682 MHz.

Figure 3H:
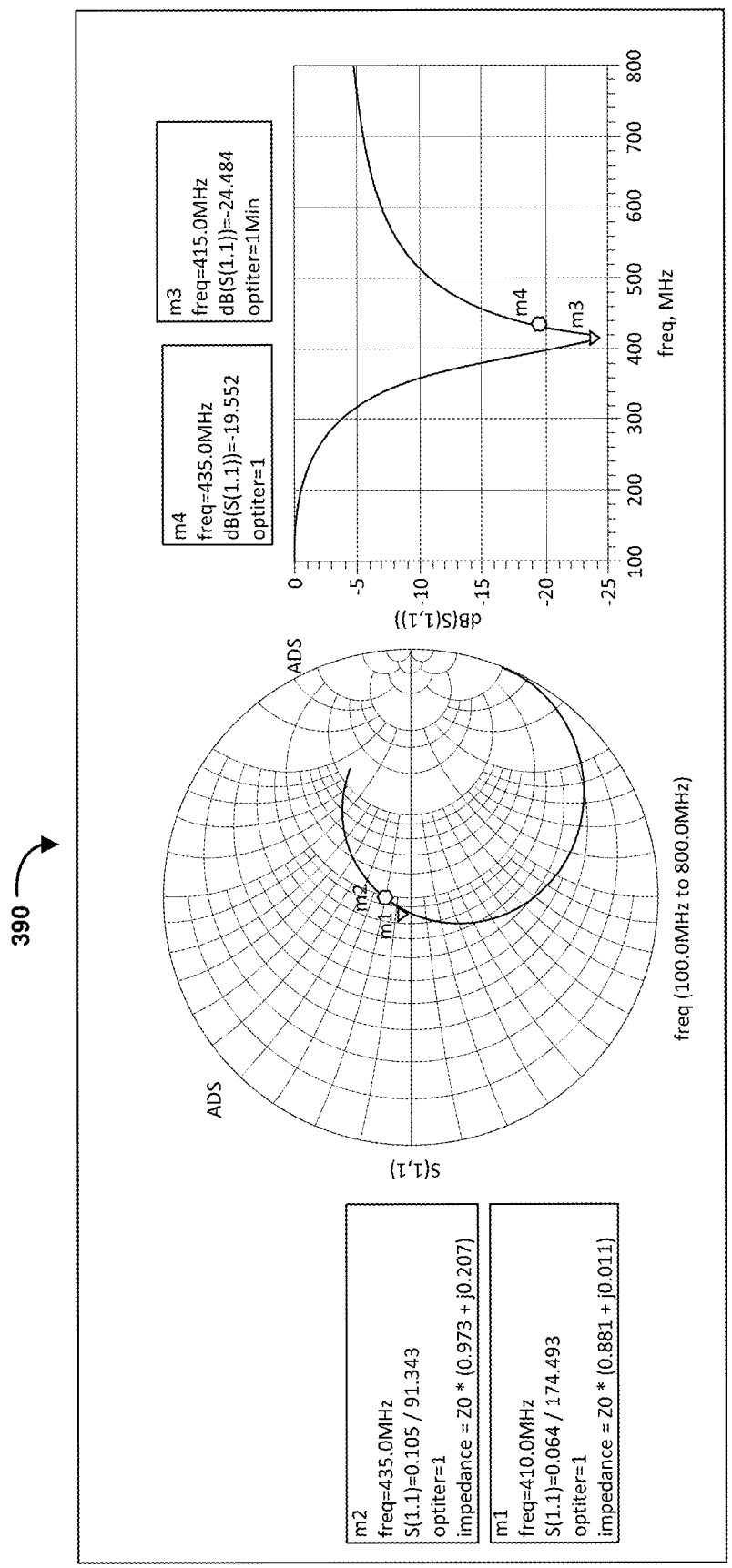
FIG. 3H is a graphical representation of an RF standing wave of the RF power emissions from the four symmetrical transceiver antennas in the outer panel assembly of cubesat, for implementing embodiments of the present disclosure.

FIG. 3H is a graphical representation of an RF standing wave 390 of the RF power emissions from the four symmetrical transceiver antennas 204A-D in the outer panel assembly 200 of cubesat 100, for implementing embodiments of the present disclosure. The RF standing wave has a relatively minimal standing wave ratio of between about −19 db and about −24 db within a selected operational frequency range of between about 415 MHz and about 435 MHz.

Figure 4:
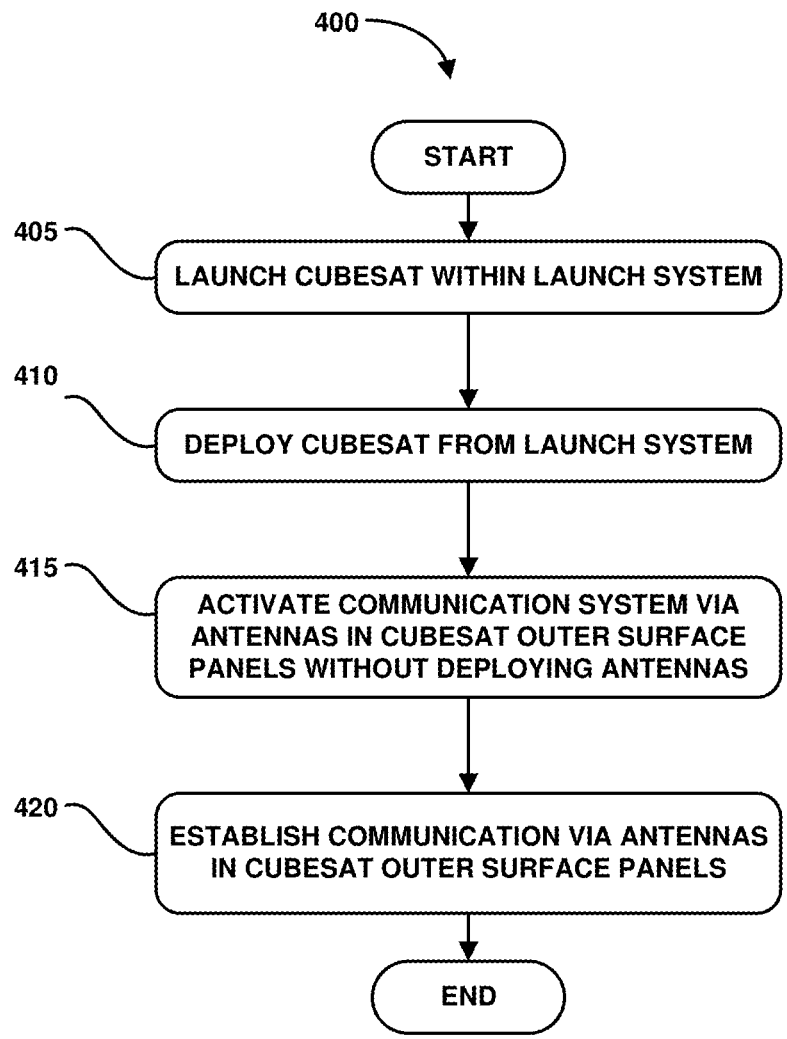
FIG. 4 is a flowchart diagram that illustrates the method operations performed in use of the cubesat transceiver antenna for implementing embodiments of the present disclosure.

FIG. 4 is a flowchart diagram that illustrates the method operations 400 performed in use of the cubesat transceiver antenna 204 for implementing embodiments of the present disclosure. The operations illustrated herein are by way of example, as it should be understood that some operations may have sub-operations and in other instances, certain operations described herein may not be included in the illustrated operations. With this in mind, the method and operations 400 will now be described.

In an operation 405, a cubesat is launched with an orbital launch system. The cubesat can be a single unit cubesat 100 or a multiunit cubesat 150 as described above. It should also be understood that the launched cubesat can be one of multiple cubesats that can be launched in a single orbital launch system.

In an operation 410, the cubesat can be deployed from the orbital launch system. The cubesat can be deployed using any suitable deployment system. Deploying the cubesat does not require deploying any antennas for the onboard communication systems as the transceiver antennas 204 are formed on at least one outer panel 200 of the cubesat 100, 150.

In an operation 415, the communication systems on the cubesat 100, 150, can be activated. Activating communication systems on the cubesat does not require deploying any antennas for the onboard communication systems as the transceiver antennas 204 are formed on at least one outer panel 200 of the cubesat 100, 150.

In an operation 420, the communication systems on the cubesat 100, 150, can establish communications to an external receiver and/or transmitter. The external receiver and/or transmitter can be located on another orbital vehicle or on a ground-based station, or both an orbital and a ground-based station. The method operations can then end. The substantially symmetrical RF field density allows the cubesat 100 to establish and maintain communications in 360 degrees phi and between about 30 degrees and about 150 degrees theta. As a result, the cubesat 100 can maintain communication while spinning in orbit in most orientations relative to the external communications station the cubesat is communicating with. On the rare occasion that the cubesat rotates so that the polar regions (e.g., +/− about 30 degrees of 0 degrees theta and about +/−30 degrees of 180 degrees theta) the communications might be momentarily interrupted. However, in many instances the communications between the cubesat and the external station are not continuous and thus any momentary loss of communications is generally acceptable.

Figure 5:
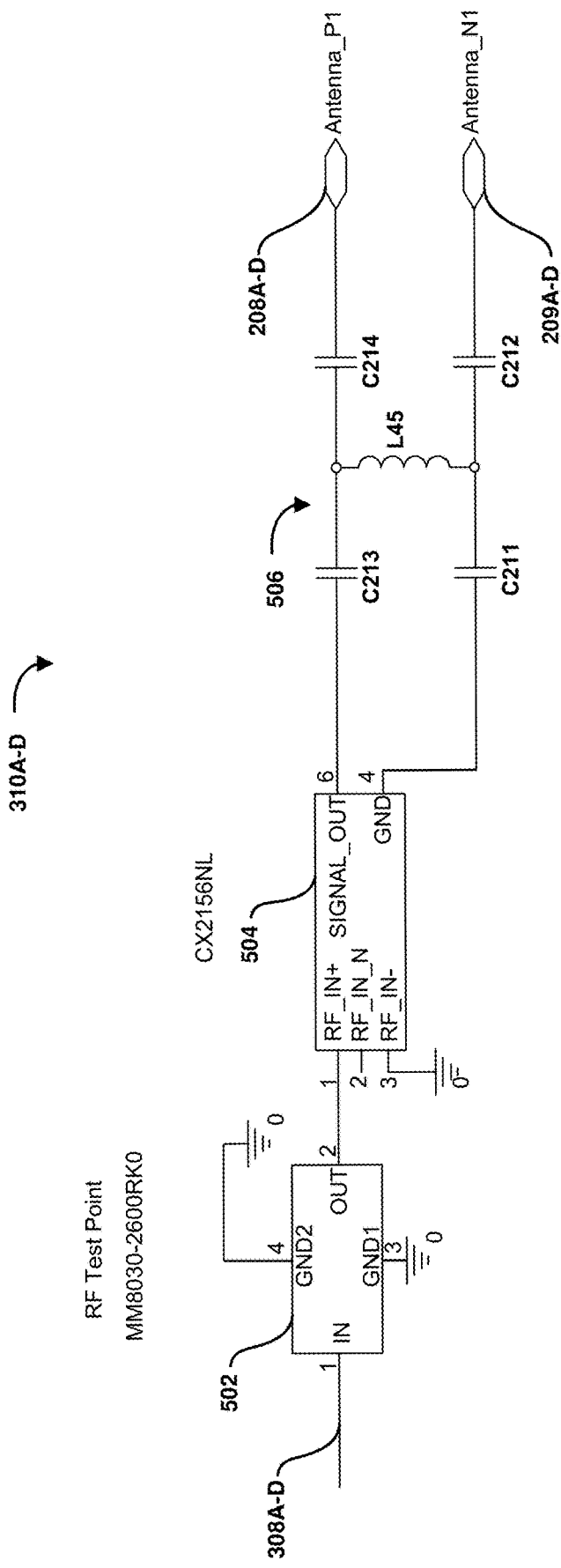
FIG. 5 illustrates a schematic diagram of the balun system, disposed on the RF distribution plane in the cubesat, for implementing embodiments of the present disclosure.

FIG. 5 illustrates a schematic diagram of the balun system 310A-D, disposed on the RF distribution plane 300 in the cubesat 100, for implementing embodiments of the present disclosure. Each of the balun systems 310A-D include the RF distribution feed 308A-D as an input to a balun circuit 504. The balun circuit 504 has an output coupled to a matching network 506. The matching network 506 has an RF positive i.e., an RF signal output, corresponding to the RF feed 208A-D, described above. The matching network 506 has an RF negative i.e., an RF return, corresponding to the RF return 209A-D, described above. An optional RF test port 502 can be disposed between the RF distribution feed 308A-D and the input to the balun circuit 504. The RF test port 502 is provided for testing purposes. It should be understood that the RF test port 502 is not required for operational purposes of the cubesat 100 and may be omitted in an operational balun system 310A-D. The components of the balun systems 310A-D can include integrated circuits or discrete components and combinations thereof.

The balun circuit 504 takes a current and/or voltage unbalanced input signal, as referenced to a chassis ground reference, and outputs a current and voltage balanced signal. The balanced signal can then be impedance matched to the corresponding transceiver antenna 204A-B by the matching network 506. In one implementation, the balun circuit 504 includes at least one transformer such as in a CX2156NL balun circuit available from DigiKey Electronics of Thief River Falls, Minn.

The matching network 506 is a series capacitive network of capacitors C211-214 with a parallel inductor L45, as shown in FIG. 5. The matching network 506 matches an output impedance of the balun circuit 504 with the impedance of the corresponding transceiver antenna 204A-B. In one implementation, the transceiver antenna 204A-B have an impedance of between about 250 and 300 ohms and the output impedance of the balun circuit is about 50 ohms. In one implementation, the transceiver antenna 204A-B have an impedance of about 273 ohms and capacitors C211-214 have a capacitance of about 11 pF and inductor L45 has an impedance of about 39 nH.

Figure 6A:
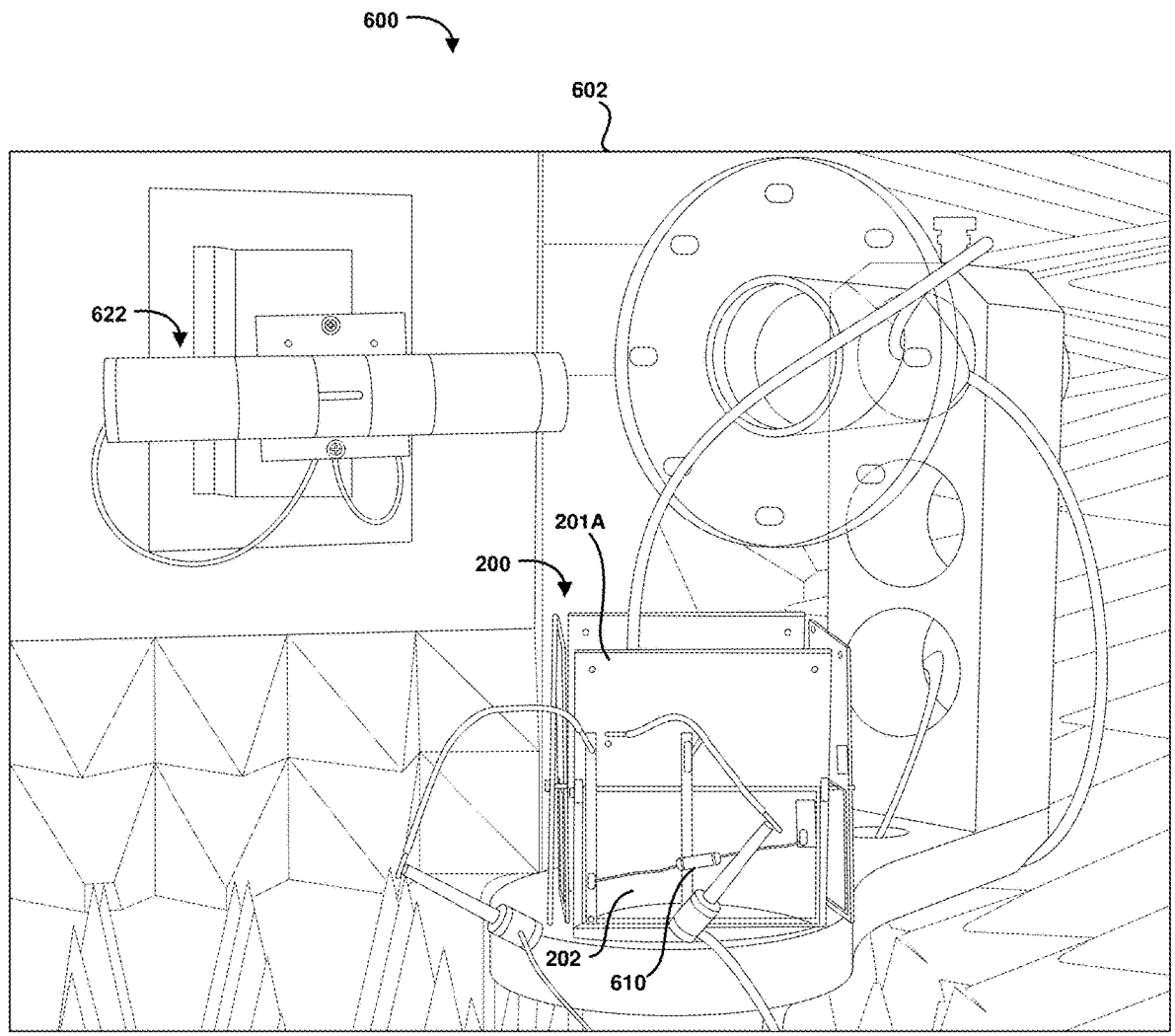
FIG. 6A illustrates a schematic diagram of an anechoic test chamber for the outer panel assembly, for implementing embodiments of the present disclosure.

FIG. 6A illustrates a schematic diagram 600 of an anechoic test chamber 602 for the outer panel assembly 200, for implementing embodiments of the present disclosure. A resistor 610 is coupled across the first portion 202 of the panel 201A. The resistor 610 simulates a solar cell or multiple solar cells disposed in the first portion 202. Current flowing through the resistor 610 simulates the solar cell producing electricity from light. RF is applied to the transceiver antennas on the outer panel assembly and the resulting RF emission patterns are detected by a wideband (e.g., 200-600 MHz) dipole antenna 622.

Figure 6B:
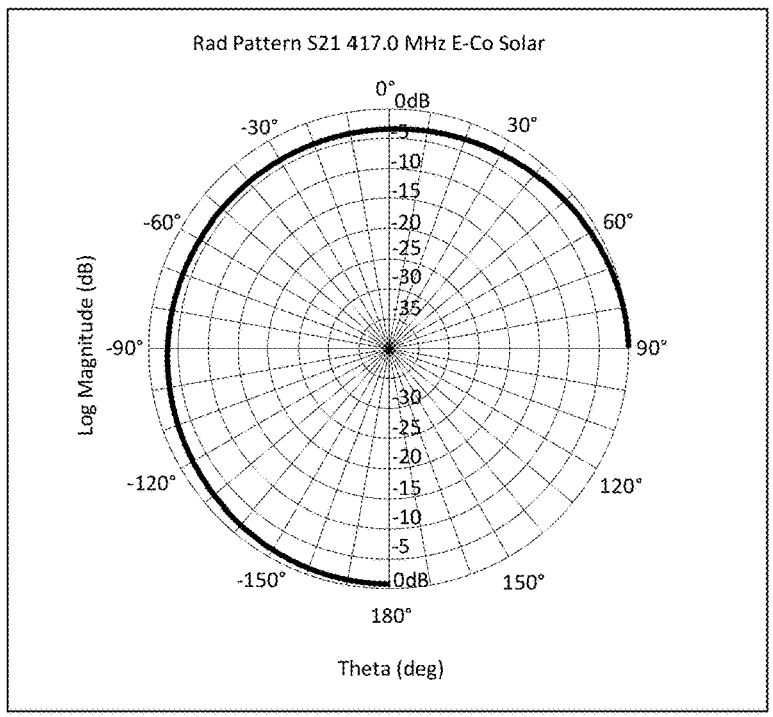
FIG. 6B is a 0 degree phi, cross-section view of RF power emission pattern from the outer panel assembly with no electrical current passing through the resistor, for implementing embodiments of the present disclosure.

FIG. 6B is a 0 degree phi, cross-section view 630 of RF power emission pattern from the outer panel assembly 200 with no electrical current passing through resistor 610, for implementing embodiments of the present disclosure. The RF emission pattern 630 is substantially symmetrical and even with no electrical current flowing through the resistor 610 to provide a baseline graph of the RF emission.

Figure 6C:
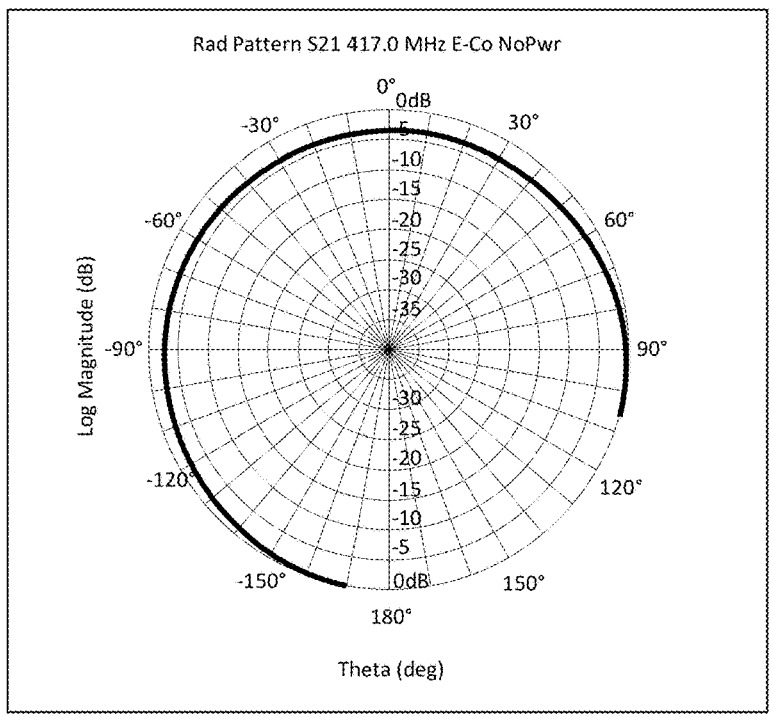
FIG. 6C is a 0 degree phi, cross-section view of RF power emission pattern from the outer panel assembly with electrical current passing through resistor, for implementing embodiments of the present disclosure.

FIG. 6C is a 0 degree phi, cross-section view 640 of RF power emission pattern from the outer panel assembly 200 with electrical current passing through resistor 610, for implementing embodiments of the present disclosure. The RF emission pattern 640 is substantially symmetrical and even with no electrical current flowing through the resistor 610. The RF emission pattern 640 is substantially similar to RF emission pattern 630. Since the RF emission pattern with and without electrical current flowing through the resistor 610 does not change, then the presence of an operating solar cell(s) in the first portion 202 of the outer panel 201A, would not interfere with the RF emission pattern.

Figure 7:
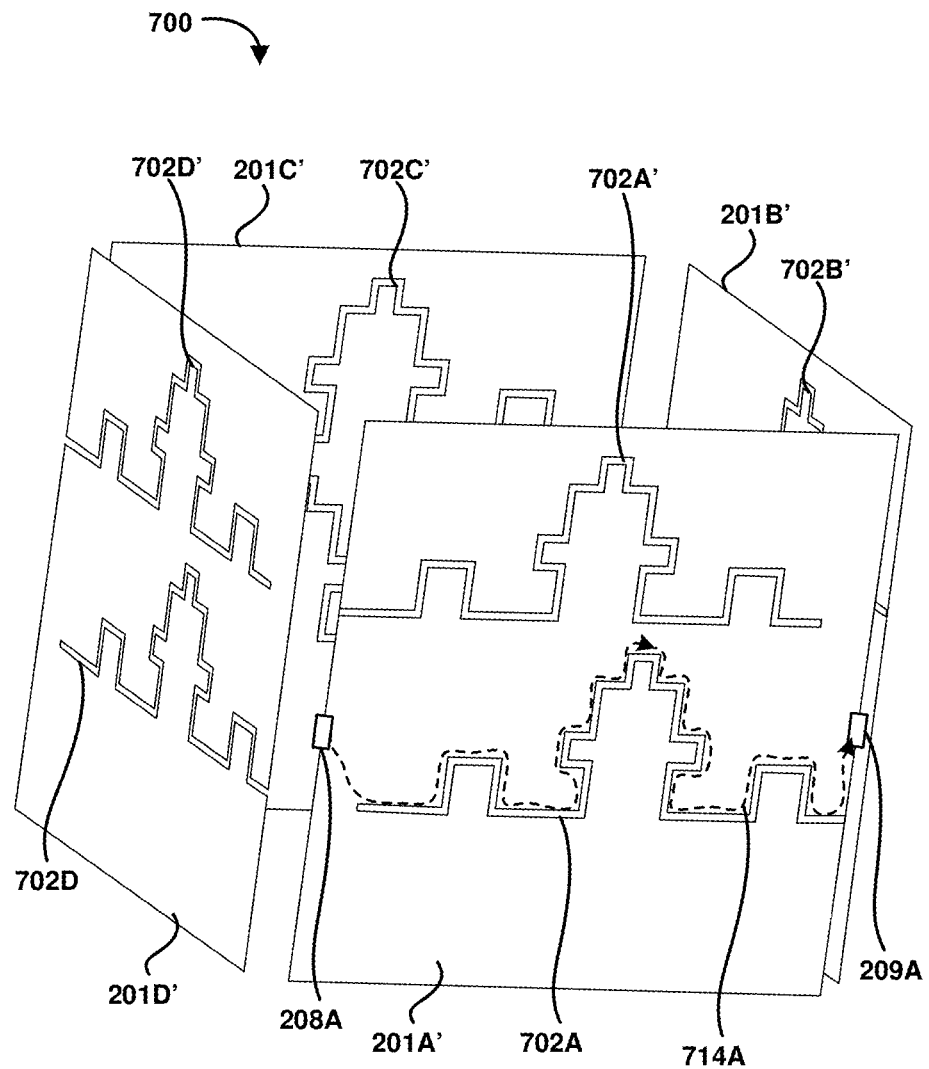
FIG. 7 illustrates a schematic view of outer panel assembly with a fractal RF gap pattern, of a 1-unit cubesat, for implementing embodiments of the present disclosure.

FIG. 7 illustrates a schematic view of outer panel assembly 700 with a fractal RF gap pattern 702A-D, of a 1-unit cubesat 100, for implementing embodiments of the present disclosure. The fractal RF gap pattern 702A-D increases the electrical length between the RF feed 208A and the RF return 209A. The RF current path 714A substantially follows the fractal RF gap pattern 702A-D from the RF feed 208A to the RF return 209A. It should be understood that FIG. 7 is not drawn to scale and the relative dimensions and scales of the various portions and features may be smaller or larger than depicted.

The fractal gap pattern 702A-D is formed using Koch fractal calculations. The gap has a width similar to the isolation gap width I1, described above. The surface of the outer panels 201A'-201D' are formed in a conductive layer similar to the conductive layer 232A, 232B, described above. The fractal gap pattern 702A-D can be etched, machined or otherwise formed in the conductive layer. Also similar to the above implementations, the outer panels 201A'-201D' can include protective layer(s), a second conductive layer, and a non-conducting substrate. The RF emissions pattern from the outer panel assembly 700 with a fractal RF gap pattern 702A-D is substantially uniform as shown for outer panel assembly 200 in the above figures.

Figure 8:
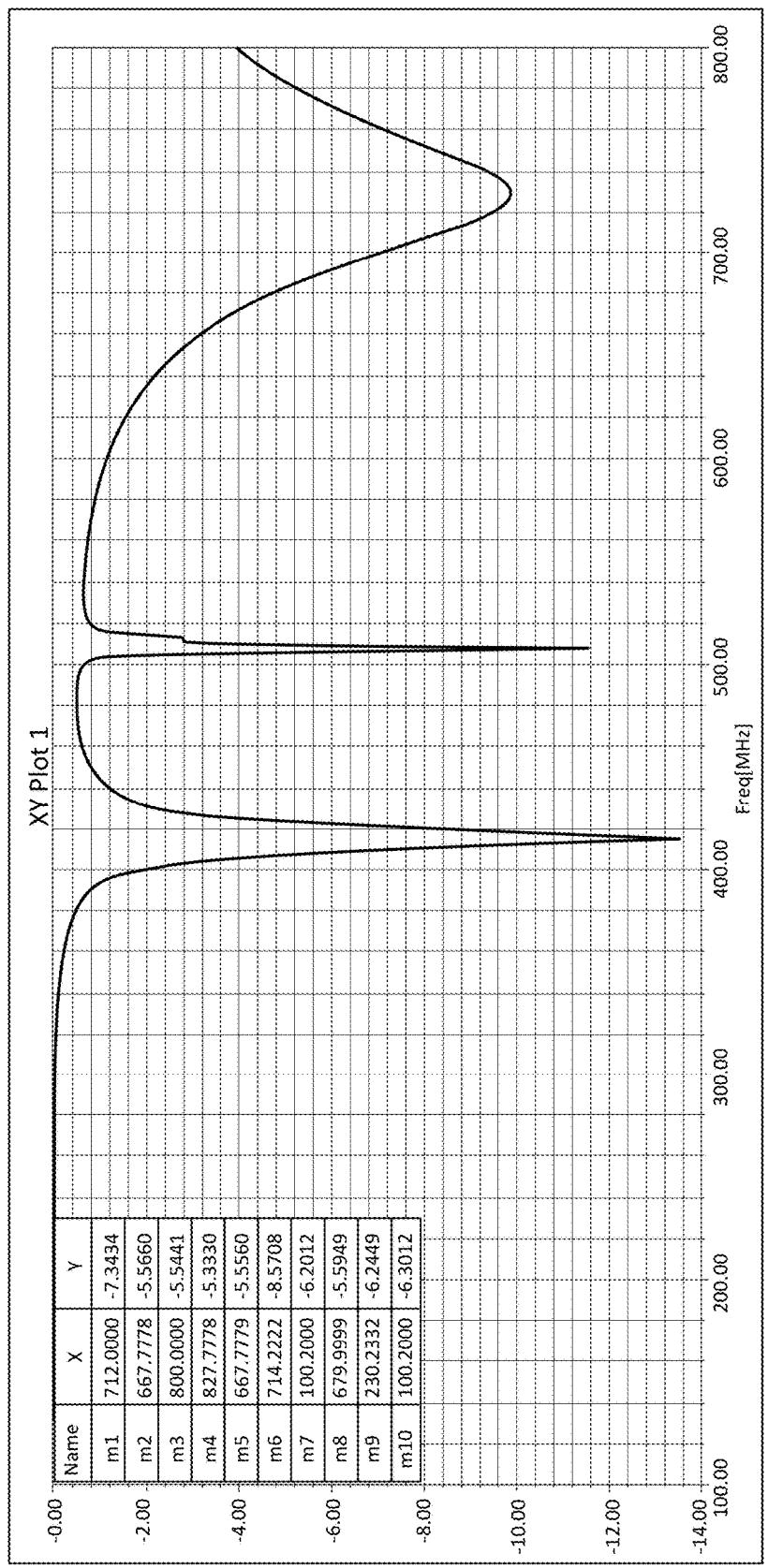
FIG. 8 is a graphical representation of an RF standing wave of the RF power emissions from the outer panel assembly with a fractal RF gap pattern in the outer panel assembly of cubesat, for implementing embodiments of the present disclosure.

FIG. 8 is a graphical representation of an RF standing wave 800 of the RF power emissions from the outer panel assembly 700 with a fractal RF gap pattern 702A-D in the outer panel assembly 700 of cubesat 100, for implementing embodiments of the present disclosure. The RF standing wave has a relatively minimal standing wave ratio of between about −5 db and about −8 db within the selected operational frequency range of between about 100 MHz and about 750 MHz.

While the foregoing descriptions has focused on a transceiver antenna systems and structures for single unit cubesat, it should be understood that the cubesat can be a single unit cubesat 100 or a multiunit cubesat 150, as described above. Further, the transceiver antennas can extend over a single unit or multiple units of a multiunit cubesat.

While the foregoing descriptions has focused on a transceiver antenna systems and structures for a cubesat, it should be understood that the disclosed transceiver antenna systems can be used on other devices and systems as well. By way of example, the transceiver antenna system could be used in structures considerably larger than the cubesat. In one exemplary implementation, the transceiver antenna systems having the disclosed dimensions could be deployed on a much larger satellite as a secondary or primary transceiver antenna system.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A cubesat comprising:
    a plurality of outer panels, the plurality of outer panels having an edge gap separating adjacent panels of the plurality of outer panels, at least one of the plurality of outer panels including:
        a transceiver antenna formed on an outer surface of the at least one of the plurality of outer panels;
        an RF feed coupled to a first edge of the at least one of the plurality of outer panels;
        a first portion having at least one edge and wherein the transceiver antenna includes a first antenna portion being substantially parallel to at the least one edge of the first portion and wherein the transceiver antenna is separated from the at least one edge of the first portion by an isolation gap having an isolation gap width;
        an active electrical component disposed in the first portion, the active electrical component capable of conducting an electrical current across at least part of the first portion; and
        an RF return coupled to a second edge of the at least one of the plurality of outer panels, the second edge being opposite from the first edge, the RF feed and the RF return being disposed at a first height along the second edge of the at least one of the plurality of outer panels, the first height corresponding to a transceiver frequency;
    an RF distribution plane electrically coupled to the RF feed and the RF return; and
    a communication system having an RF input/output port coupled to the RF distribution plane.

2. The cubesat of claim 1, wherein the at least one of the plurality of outer panels includes two outer panels.

3. The cubesat of claim 2, wherein the two outer panels are disposed on opposite sides of the cubesat.

4. The cubesat of claim 1, wherein the at least one of the plurality of outer panels includes four outer panels.

5. The cubesat of claim 1, wherein the RF distribution plane includes:
    an RF input/output port;
    an RF distribution point electrically coupled to the RF input/output port by an RF line feed; and
    a plurality of balun systems electrically coupled to the RF distribution point by corresponding RF distribution feeds.

6. The cubesat of claim 5, further comprising each one of the balun systems, corresponding distribution feeds, the RF feeds and the RF returns have an equal electrical length between the RF distribution point and the corresponding edges of the at least one of the plurality of outer panels.

7. The cubesat of claim 5, further comprising each one of the balun systems, corresponding distribution feeds, the RF feeds and the RF returns have an equal physical length between the RF distribution point and the corresponding edges of the at least one of the plurality of outer panels.

8. The cubesat of claim 1, wherein the cubesat is a multiunit cubesat.

9. The cubesat of claim 8, wherein the at least one of the plurality of outer panels includes at least two outer panels and a first one of the two outer panels is fixed to a first unit of the multiunit cubes at and a second one of the two outer panels is fixed to a second unit of the multiunit cubesat.

10. The cubesat of claim 1, wherein the isolation gap width has a width sufficient to prevent the RF current flow from arcing across the isolation gap from the transceiver antenna to the first portion.

11. The cubes at of claim 1, wherein the first height provides a standing wave ratio of between about −7 db and about −10 db at the transceiver frequency.

12. The cubesat of claim 1, wherein the transceiver antenna radiates RF from the edge gap separating the adjacent panels, the edge gap having an edge gap width corresponding to a bandwidth of RF radiated from the edge gap.

13. The cubesat of claim 12, wherein the edge gap width is between about 3 mm and about 6 mm.

14. The cubesat of claim 1, wherein the at least one of the plurality of outer panels includes four outer panels disposed on an outer perimeter of the cubesat and wherein activating the communications system creates a symmetrical 0 degree phi, cross-section RF emission density.

15. A cubesat system comprising:
    a plurality of outer panels, the plurality of outer panels having an edge gap separating adjacent panels of the plurality of outer panels, at least four of the plurality of outer panels including:
        a transceiver antenna formed on an outer surface of the at least four of the plurality of outer panels;
        a first portion separated from the transceiver antenna by an isolation gap having an isolation gap width sufficient to prevent the RF current flow from arcing across the isolation gap from the transceiver antenna to the first portion;
        an active electrical component disposed in the first portion, the active electrical component including a solar cell capable of generating an electrical current across the first portion;
        an RF feed coupled to a first edge of each one of the at least four of the plurality of outer panels;
        an RF return coupled to a second edge of each one of the at least four of the plurality of outer panels, the second edge being opposite from the first edge, the RF feed and the RF return being disposed one half a height of the at least one of the plurality of outer panels;
    an RF distribution plane having an equal length electrical coupling to the RF feed and the RF return; and
    a communication system having an RF input/output port coupled to the RF distribution plane.

16. The system of claim 15, wherein the equal length electrical coupling includes an equal physical length electrical coupling.

17. The system of claim 15, wherein the equal length electrical coupling includes an equal electrical length electrical coupling.

\* \* \* \* \*